April 7, 1925.  G. GETTING ET AL  1,532,807
ENDLESS CONVEYER BELT
Filed June 11, 1921   3 Sheets-Sheet 1
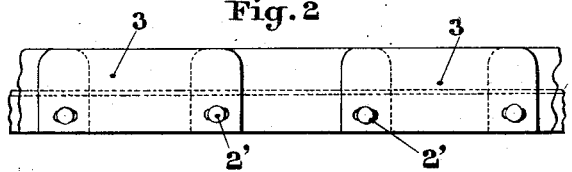
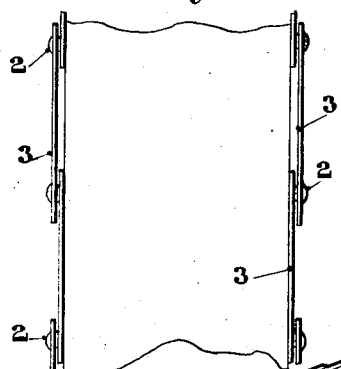
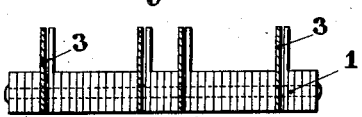
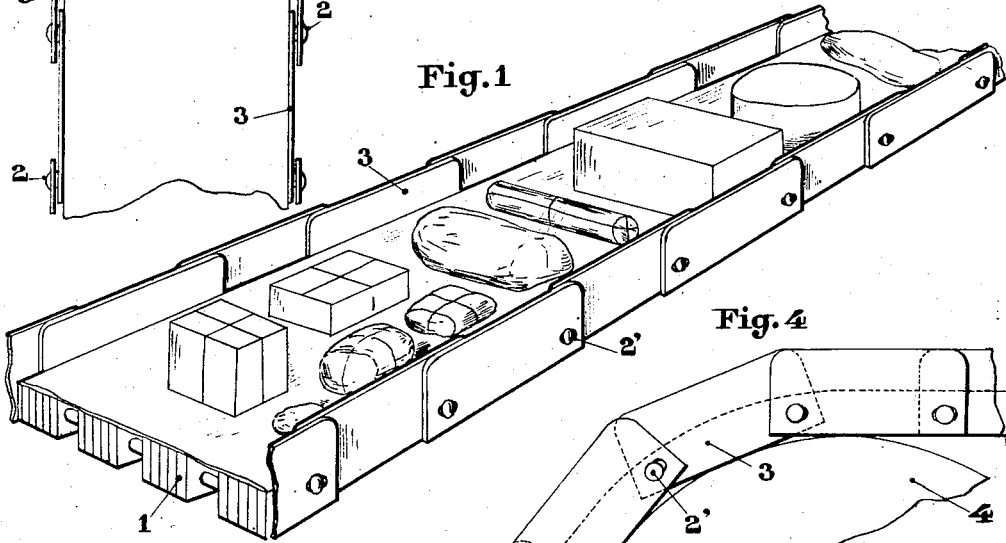
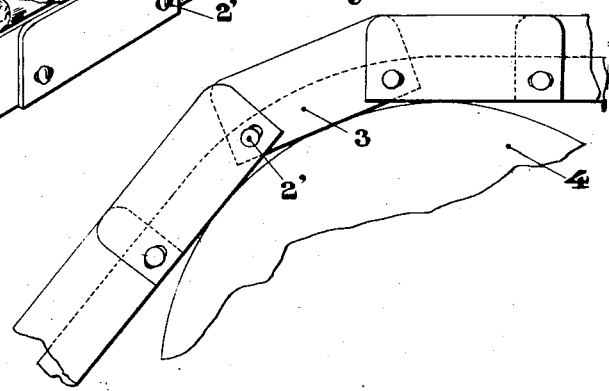
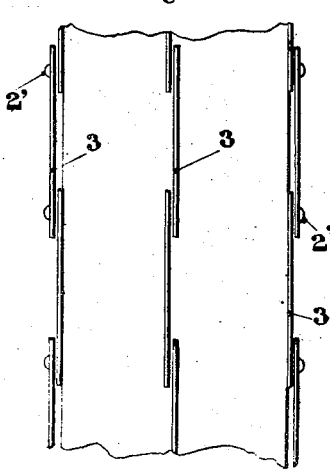
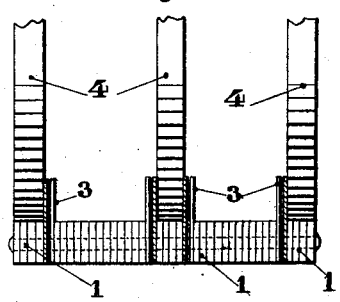
INVENTORS:
Georges Getting
Adrien Jonas
BY
ATTORNEYS.

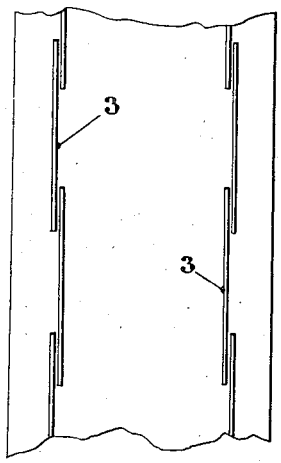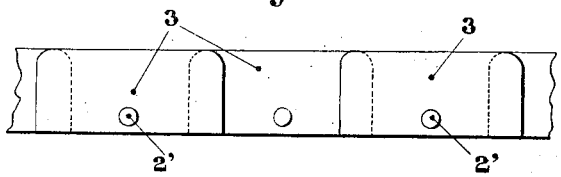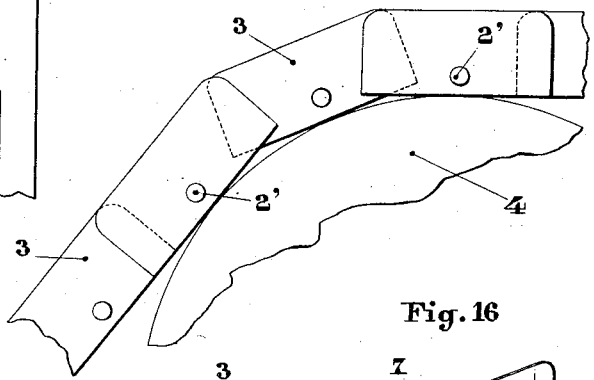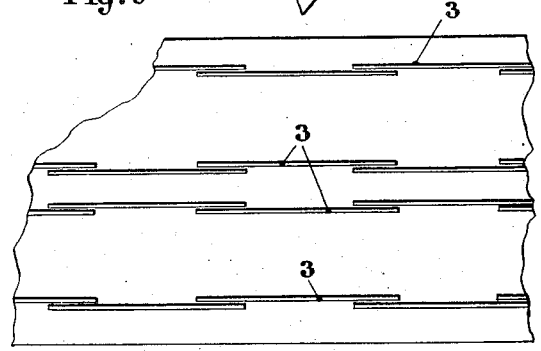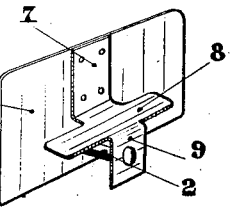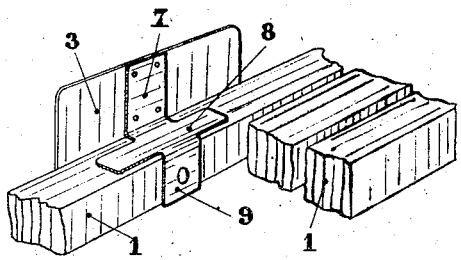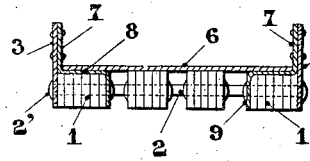

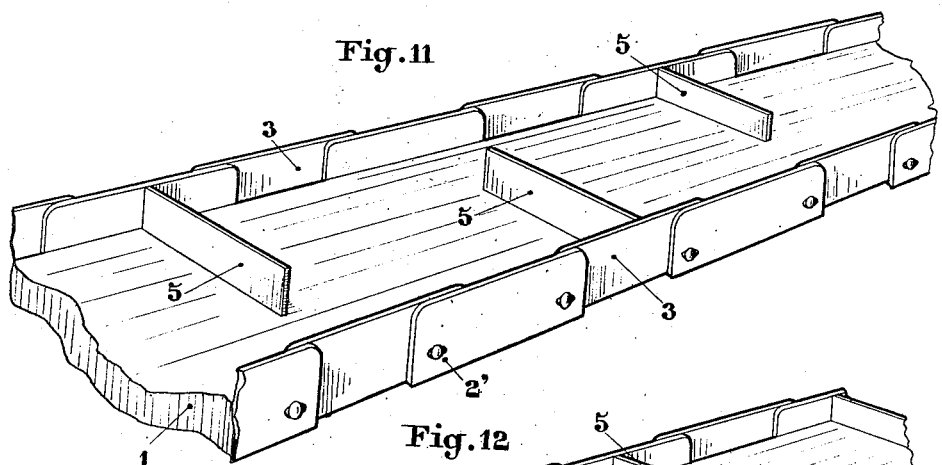
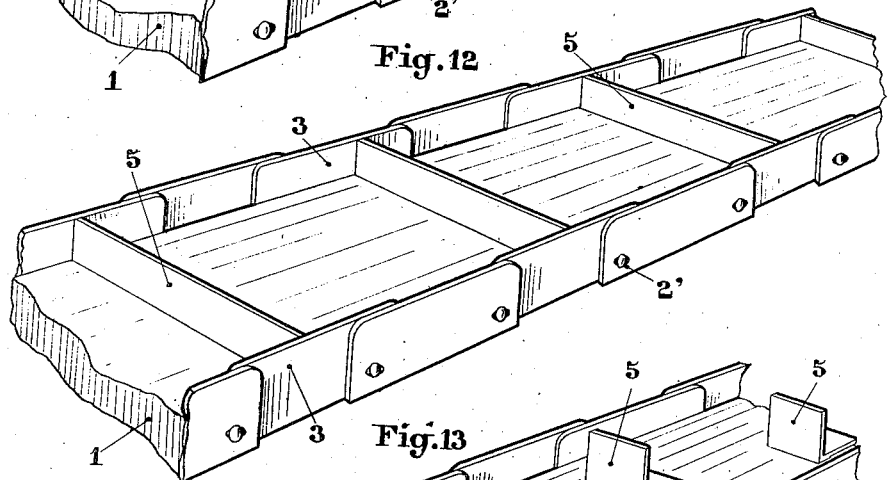
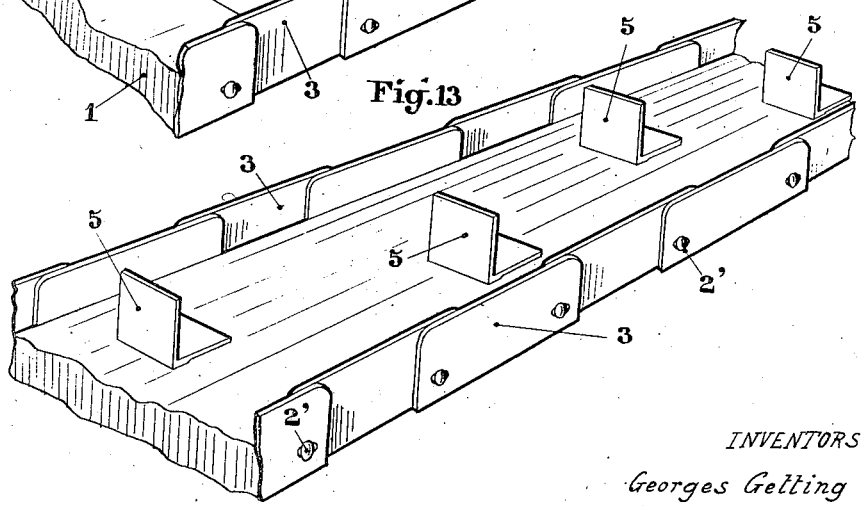

Patented Apr. 7, 1925.

1,532,807

UNITED STATES PATENT OFFICE.

GEORGES GETTING AND ADRIEN JONAS, OF ST.-DENIS, FRANCE.

ENDLESS CONVEYER BELT.

Application filed June 11, 1921. Serial No. 476,759.

*To all whom it may concern:*

Be it known that we, GEORGES GETTING, a citizen of the French Republic, residing at No. 2 Rue Coquenard, St.-Denis, Seine, France, and ADRIEN JONAS, a citizen of the French Republic, residing at the address above given, have invented certain new and useful Improvements in Endless Conveyer Belts, of which the following is a specification.

This invention relates to constructions of belts for mechanical conveyers comprising a flexible belt that is guided by and rests on rollers or pulleys, some of which are driving pulleys and serve to cause its movement.

This invention has more particularly for its object to provide improved belts of this known type, composed of juxtaposed leather straps either arranged in laterally spaced groups or to form a substantially continuous surface and which are connected, usually in pairs, by means of crosspins arranged diamond-fashion, each element being composed of a plurality of strips or of only one strip.

This invention comprises also the combination with belts of this kind, of devices designed to form with said belts, longitudinal walls or partitions in such a manner as to constitute with the surface of the belt, one or more channels or gangways intended for the reception of the merchandise or articles to be conveyed.

These walls or partitions are distributed and articulated upon cross pins that form part of the construction of the belt and that serve as pivot pins. They may be combined with plates supported by the said walls or only by the belt, and are designed to assure the carrying along of the materials or articles to be conveyed.

Some embodiments of this invention are illustrated in the accompanying drawings, in which:—

Figs. 1, 2 and 3 are respectively a perspective view, a side elevation and a cross-section of a portion of the improved belt, forming a single channel with two series of plates fitted to the sides of the said belt in such a manner that the whole will have a U-shape cross-section. In Fig. 1 articles are shown being conveyed by the improved belt.

Fig. 4 illustrates the passage of this improved belt over a drum or pulley.

Figs. 5, 6, 7 and 8 illustrate diagrammatically in plan some methods of arranging walls formed by articulated plates.

Fig. 9 is a cross-section relative to Fig. 8.

Fig. 10 shows this belt passing under guide pulleys.

Fig. 11 illustrates a construction of the improved belt comprising carrier plates fitted to the articulated side plates.

Fig. 12 shows another construction of carrier plates for connecting the side plates two by two.

Fig. 13 illustrates a construction comprising carrier plates mounted directly on the belt.

Figure 14 is a side view showing a modified form of connecting the side plates to the belt. Figure 15 is a side view of the belt shown in Figure 14 passing over a pulley. Figure 16 is a perspective detail of the plates used in Figures 14 and 15. Figure 17 is a cross section of the belt shown in Figures 14 and 15, and Figure 18 is a broken away perspective of the belt shown in Figures 14 to 17 inclusive.

In Figs. 1, 2 and 3 which illustrate an improved belt composed of laterally spaced groups, 1 are the leather straps and 2 are the crosspins. The side walls are constituted by plates 3 of suitable size, of metal or any other suitable material, which are fitted to the outer sides of the longitudinally extending straps 1, being mounted on the ends 2' of the crosspins, or those crosspins that serve them both as supports and pivots.

In this construction each plate 3 is mounted on two crosspins, and the orifices by which the said plate is mounted on the ends 2' of the crosspins, are slightly elongated in order to allow of the necessary play.

The belt thus comprises two series of articulated side flanges in such a manner that the plates that constitute the said flanges assume relatively to one another the necessary angular positions when the belt is passing around a drum as shown in Fig. 4.

In this construction shown in Figs. 1, 2 and 3, the belt is provided with a web 6 of canvas or any other suitable material so as to provide a continuous surface designed to receive the goods to be conveyed.

The articulated side flanges 3 may be arranged in two rows or in a greater number of rows as indicated in Figs. 5, 6, 7, 8 and 9, in such a manner as to form one or more channels or gangways.

The construction illustrated in Figs. 7, 8 and 9 is more particularly designed for the purpose of providing rolling tracks for rollers for guiding or driving the belt as shown in Fig. 10 where the said rollers are indicated at 4. As shown in Figures 9 and 10, the straps 1 instead of being arranged in spaced groups are placed in juxtaposition entirely across the belt to form a substantially continuous surface.

If desired, the belt may be provided with carrier plates such as the plates 5, extending partially across between and fixed to the side flanges 3 as shown in Fig. 11.

These carrier plates may also extend over the whole width of the belt and connect the side flanges 3 two by two as shown in Fig. 12.

The carrier plates may also be fixed directly to the belt without being connected to the side flanges as shown in Fig. 13.

It is to be understood that in this manner various embodiments may be constructed adapted to the various conditions or purposes of use of the conveyer.

Figs. 14, 15, 16, 17 and 18 illustrate another construction of the side flanges 3. According to this construction each side flange instead of being supported by two crosspins as in the foregoing figures, is supported by one single crosspin. This manner of mounting on one single crosspin nenessitates a special arrangement for preventing the side flange from tipping to one side or the other or to turn on its pivot in such a manner as to assume an indifferent position around its axle.

For this purpose each side flange 3 has connected to it a counter-plate 7—8—9 riveted by means of its part 7 against the side flange 3.

The part 8 is fitted flat upon the belt and its part 9 is inserted between the element of the belt to which the side flange 3 is fitted, and the adjacent element.

The crosspin 2 engages with its ends in the part 9 and the side flange 3.

The part 9 which is inserted between two elements of the belt and the part 8 that fits flat against the element, hold the side plate 3 in position at right angles to the plane of the belt and prevents the said side flange from turning indifferently around the crosspin 2 that serves as its axle.

In all cases the improved belt may be of the type comprising a plurality of spaced groups of straps as shown in Figs. 1, 3, 17 and 18 or it may be of the type comprising a substantially continuous structure as shown in Figs. 9, 10, 11, 12 and 13.

The improved construction of conveyer belt has the advantage of combining a small weight for a great conveying capacity compared with the various known apparatuses, and it allows of working at speeds which is not permissible with the known apparatuses.

What we claim is:—

In an endless conveyer belt, a plurality of flexible straps placed side by side with their faces in abutting relation and edges thereof capable of engagement with the face of a pulley or drum, pins extending transversely through said straps and projecting outwardly beyond the sides thereof, and a plurality of rows of plates extending at right angles to the plane of the conveying surface of said belt, said plates being pivotally mounted on said pins and arranged to constitute articulated overlapping flanges forming longitudinal channels for the reception of goods to be conveyed.

In testimony whereof we have signed our names to this specification.

GEORGES GETTING.
ADRIEN JONAS.